(12) United States Patent
Donnelly

(10) Patent No.: US 9,341,073 B2
(45) Date of Patent: May 17, 2016

(54) TURBINE THRUST CONTROL SYSTEM

(71) Applicant: General Electric Company, Schenectady, NY (US)

(72) Inventor: Stephen Raymond Donnelly, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 433 days.

(21) Appl. No.: 13/962,293

(22) Filed: Aug. 8, 2013

(65) Prior Publication Data

US 2015/0044024 A1 Feb. 12, 2015

(51) Int. Cl.
*F01D 11/02* (2006.01)
*F01D 3/04* (2006.01)

(52) U.S. Cl.
CPC ............. *F01D 11/025* (2013.01); *F01D 3/04* (2013.01); *F05D 2220/31* (2013.01); *Y02E 20/16* (2013.01)

(58) Field of Classification Search
CPC ......... F01D 3/04; F01D 11/02; F01D 11/025; F01D 11/06
See application file for complete search history.

(56) References Cited

U.S. PATENT DOCUMENTS

| 5,002,288 | A | 3/1991 | Morrison et al. |
| 6,443,695 | B2 | 9/2002 | Kikuchi et al. |
| 6,502,823 | B1 | 1/2003 | Turnquist et al. |
| 6,892,540 | B1 | 5/2005 | Tisenchek |
| 6,957,945 | B2 | 10/2005 | Tong et al. |
| 7,195,443 | B2 | 3/2007 | Vandervort et al. |
| 2006/0140747 | A1 | 6/2006 | Vandervort et al. |
| 2010/0158674 | A1* | 6/2010 | Turnquist ............ F01D 11/025 415/173.1 |
| 2011/0318169 | A1* | 12/2011 | Zheng ................. F01D 11/025 415/169.1 |

* cited by examiner

*Primary Examiner* — Audrey K Bradley
(74) *Attorney, Agent, or Firm* — Ernest G. Cusick; Hoffman Warnick LLC

(57) ABSTRACT

Systems and programs for controlling thrust in a turbine by adjusting the clearance between a packing seal and a rotating component are disclosed. In one embodiment, a system includes a controller configured to move a packing seal to a selected clearance position in response to a thrust pressure exceeding a target pressure, and a sensor coupled to the controller and configured to detect the thrust pressure.

15 Claims, 7 Drawing Sheets

TURBINE THRUST CONTROL SYSTEM

BACKGROUND OF THE INVENTION

The disclosure relates generally to rotary turbomachines, and more particularly, to a system and program product for controlling forces, pressures, and thrust against turbine rotors and their subcomponents.

Turbine systems can be used to generate mechanical or electrical power. Steam turbines, as one example, are highly efficient as the expansive force of steam is greater than many of the common gases used for powering turbines.

Greater operating efficiencies often require that high temperatures and high pressures be used. In turn, robust operation of turbines under these conditions can be problematic. For example, previous steam turbine solutions have used inlet temperatures and pressures of 760° C. (1400° F.) and 38.6 MPa (5600 psi). Other common conditions for a modern boiler and steam turbine system can be approximately 565° C. (1050° F.) and 16.5 MPa (2400 psi). These turbine systems sometimes incorporate "reheat," referring to one or more process steps where steam reenters a boiler for one or more stages of heat addition.

Typically, the first turbine section downstream of the boiler and upstream of the reheat is referred to as the high pressure (HP) turbine section. Exhaust steam from the high pressure (HP) turbine section is sent to the boiler for reheating along a cold reheat line. The reheated steam can be heated to the initial inlet temperature before flowing into an intermediate pressure (IP) turbine section. Exhaust from the IP turbine enters and flows through the low pressure (LP) turbine before exiting as exhaust to the condenser. Some systems may not incorporate the IP section, and more complex systems may have multiple reheat stages. Physical design of the system can vary, depending on the application. Several turbine sections can reside within the same casing, or multiple casings may exist.

A main output shaft and an area proximate to the spinning steam turbine rotor can each include bearings designed to handle high temperatures and high pressures. These bearings can include internal oil seals located between the bearing and the output shaft. In addition, a "thrust fitting" can absorb the axial load developed by the power train. Bearings and thrust fittings can be held in place, or held in a limited range of movement, by axial thrust forces and/or hydraulic forces of oil in the bearing. This thrust force can be created through a combination of the fluid inertia acting on the turbine buckets, and the pressure developed by variation in cross-sectional area acting against portions of the system. As the respective bearings or thrust fittings may only withstand certain temperatures and pressures of a corresponding gas (e.g., steam) or operating fluid, the thrust pressure applied and resultant from the steam should be within permissible temperature and pressure levels.

Additional considerations associated with thrust fittings are that thrust fittings do not readily accept multiple and repeated directional changes in thrust, and that a turbine can become unstable when the amount of resultant thrust acting on a rotor or its subcomponents approaches zero. As a result, thrust fittings are designed to be pressurized in a stable manner from one direction or the other; their ability to rapidly absorb directional reversals in thrust is limited.

BRIEF DESCRIPTION OF THE INVENTION

A system for controlling thrust in a turbine is disclosed.

A first aspect of the invention includes: a system for controlling thrust in a turbine, the system comprising: a controller configured to move a packing seal to a selected clearance position in response to a thrust pressure exceeding a target pressure; and a sensor coupled to the controller and configured to detect the thrust pressure.

A second aspect of the invention includes: a program product stored on a non-transitory computer readable storage device, the program operative to control thrust in a turbine when executed, the non-transitory computer readable storage device comprising program code for: receiving a thrust pressure value; determining a desired clearance position of a packing seal relative to a rotor based on the thrust pressure value being different from a target pressure; and providing instructions for moving the packing seal to the desired clearance position.

A third aspect of the invention includes a system for controlling thrust in a turbine, the system comprising: a controller configured to control movement of a packing seal, wherein the packing seal is radially distal to a thrust fitting, to a selected clearance position in response to one of the following: a thrust pressure against the thrust fitting exceeding a target pressure; and a pressure drop across the packing seal exceeding a target pressure drop; wherein the selected clearance position causes one of a net positive thrust and a net negative thrust against the thrust fitting.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-6, like numbering may represent like elements. Redundant explanation of these elements has been omitted for clarity. Finally, it is understood that the components of FIGS. 1-6 and their accompanying descriptions may be applied to any embodiment described herein.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used, and that changes may be made without departing from the scope of the present teachings. The following description is, therefore, merely exemplary.

The present embodiment may include a thrust control system for a turbine and may be embodied as a control system configured to move one or more packing seals. This control system is suitable for use in a turbine having underlying primary turbine structures or sections. Thus, the entire structure of a turbine subject to control by the present control system is not shown. It is noted herein that the control system is not limited to control of one particular type of turbine.

Turning to the FIGURES, embodiments of systems and devices are shown, which are configured to control the effects of thrust within a turbine system. Each of the components in the FIGURES may be connected via conventional means, e.g., via a common conduit or other known means as is indicated in FIGS. 1-7.

Figure 1:
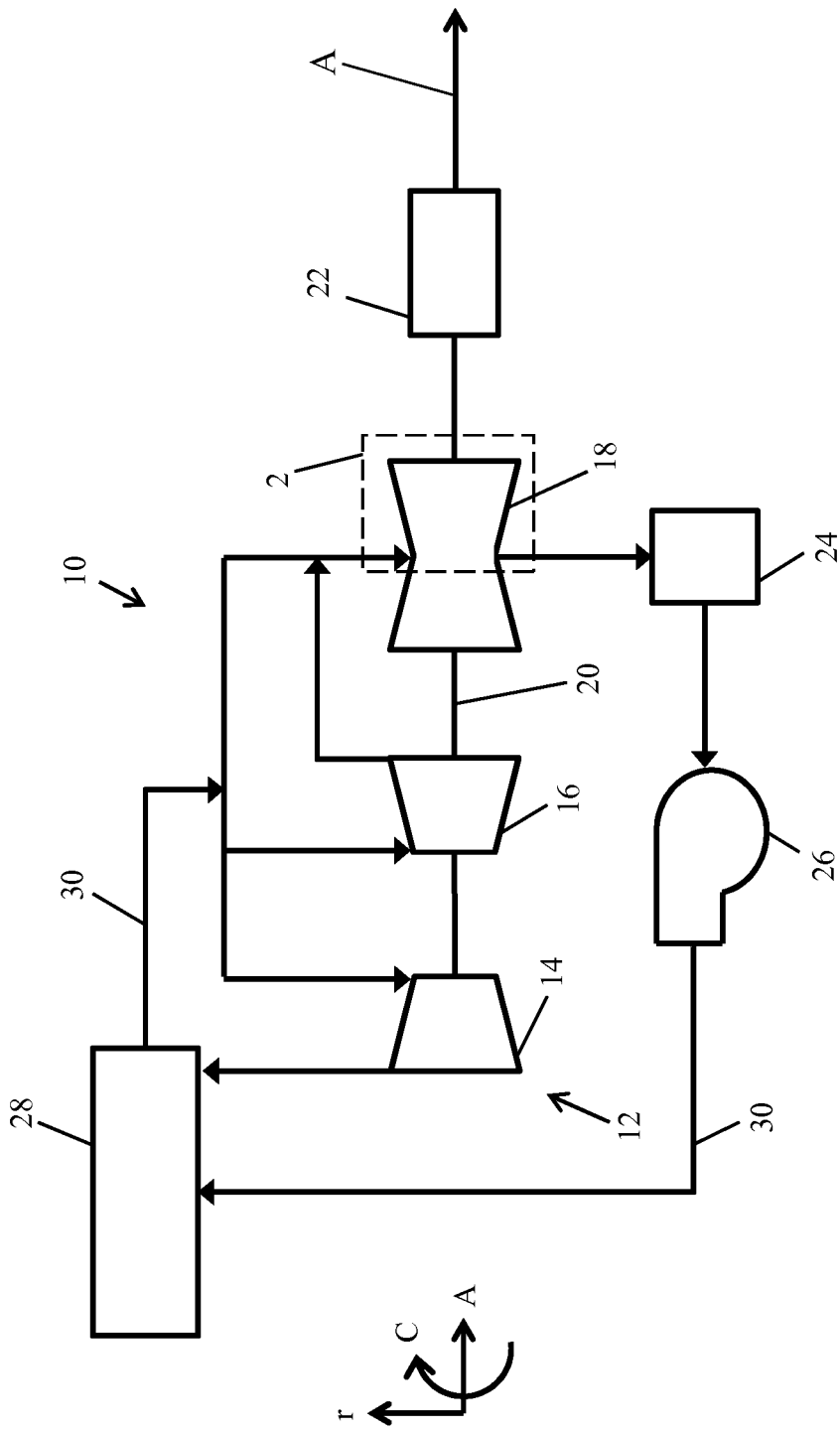
FIG. 1 is a schematic view of an example turbine system according to an embodiment of the invention.

Referring to FIG. 1, a schematic depiction of a turbine system 10 is shown according to embodiments of the invention. Turbine system 10 discussed herein is shown by example to be a steam turbine, but any turbine system (e.g., a gas turbine) or its equivalent is also contemplated. Turbine system 10, as shown in FIG. 1 may be, for example, a conventional steam turbine system. As such, a brief description of the turbine system 10 is provided for clarity. As shown in FIG. 1, turbine system 10 may include a turbine component 12, including a high-pressure section 14, an intermediate-pressure section 16 and a low-pressure section 18, coupled to a rotor 20 of turbine system 10. Rotor 20 may also be coupled to a load such as a generator 22 for creating electricity during operation of turbine system 10. As shown in FIG. 1, turbine system 10 may also include a condenser 24 in fluid communication with low-pressure section 18 of turbine component 12, a blower 26 in fluid communication with condenser 24 and a boiler 28 in fluid communication with the blower and turbine component 12. The components of turbine system 10 (e.g., condenser 24, blower 26, and boiler 28) may be in fluid communication with one another via conduits 30.

During operation of turbine system 10, as shown in FIG. 1, steam can be generated by boiler 28 and provided to turbine component 12. More specifically, boiler 28 can provide steam to high-pressure section 14, intermediate-pressure section 16 and/or low-pressure section 18 via conduits 30 to flow through turbine component 12. The steam may exit steam turbine component 12, specifically at low-pressure section 18, and may be condensed by condenser 24 and provided to boiler 28 via blower 26. The condensed-steam may then aid in the generation of more steam by boiler 28 and may subsequently be provided to steam turbine component 12.

As used herein, the terms "axial" and/or "axially" refer to the relative position/direction of objects along axis A, which is substantially parallel to the axis of rotation of the turbomachine (in particular, rotor 20). As further used herein, the terms "radial" and/or "radially" refer to the relative position/ direction of objects along axis (r), which is substantially perpendicular to axis A and intersects axis A at only one location.

Figure 2:
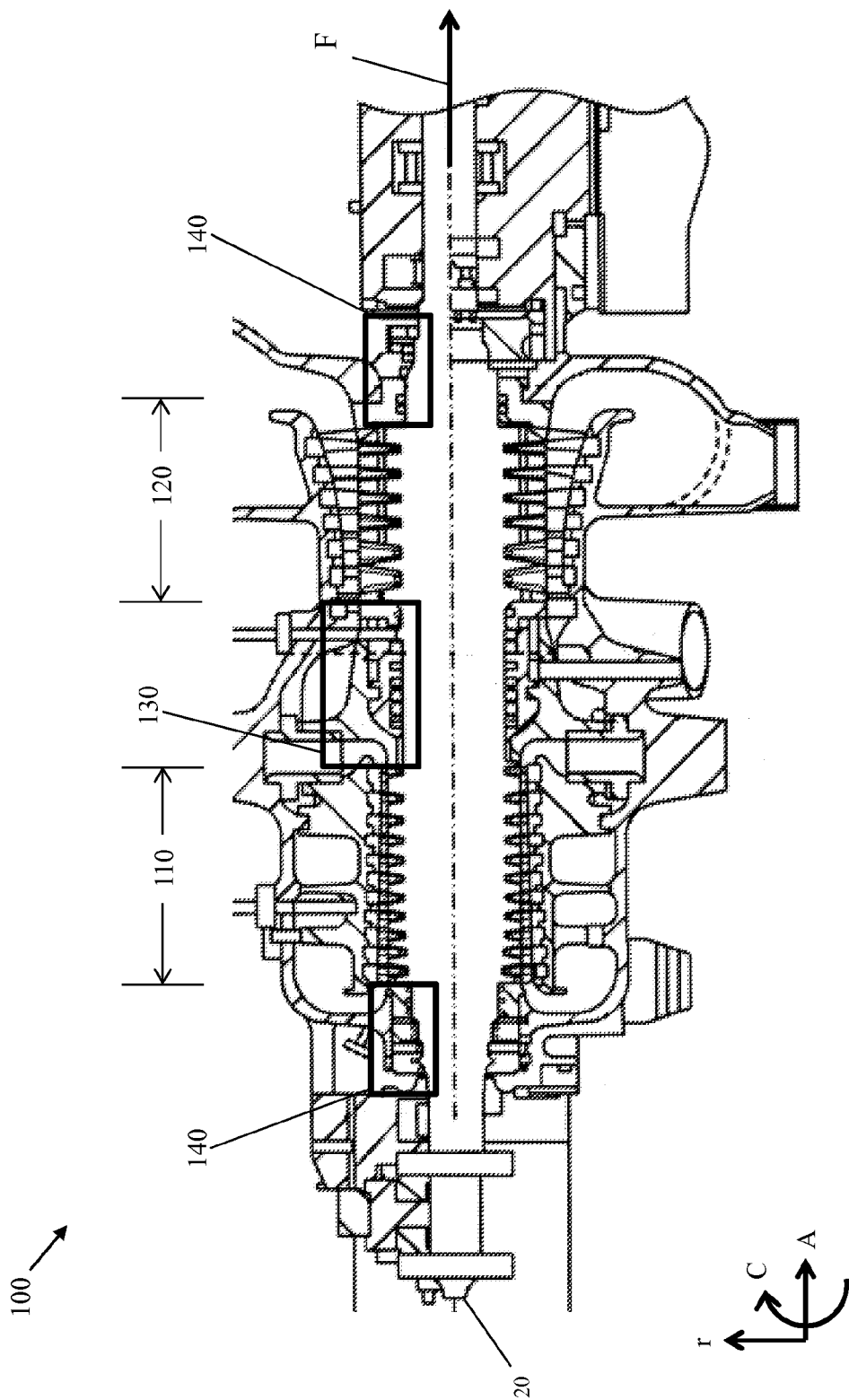
FIG. 2 is a side view of an exemplary flow path along a rotating component according to an embodiment of the invention.

Turning to FIG. 2, a cross sectional diagram of a turbine section 100 is shown. Turbine section 100 can include rotor 20, configured to rotate along line C about axis A. Rotor 20 can permit a fluid, including steam or gas, to flow alongside rotor 20 in a single direction or in an "opposed flow" fashion, with fluids traveling in varying directions. Rotor 20 is shown to have a resultant force F extending along axis A (see legend), which can be caused by force or pressure imparted by steam or gas to rotor 20. Resultant force F can further represent a thrust force or thrust pressure imparted against components, fittings, or components of rotor 20 (or portions thereof) by fluids traveling alongside rotor 20 and contacting portions thereof. Opposed flow turbine implementations can also cause resultant force F to be oriented in the opposite direction.

Turbine section 100 can further include a first section 110, which can be a high pressure section of a turbine. Similarly, a second section 120 can also be provided within turbine section 100, and can be an intermediate pressure, low pressure, or "reheat" section of a turbine. A junction 130 between two sections 110, 120 of turbine section 100 and can further house mechanical components such as packing seals, which can be used in accordance with embodiments of the invention as discussed elsewhere herein. In other embodiments, additional junctions 140 can also be provided adjacent to first and/or second sections 110, 120 and may include various components according to embodiments of the invention. In further embodiments, additional sections (not shown) can also be provided within turbine section 100 and connected to each other at respective junctions. Flow paths alongside rotor 20 can therefore be modified in a variety of configurations, with various mechanical components, e.g. packing seals, provided throughout turbine section 100 as desired.

Figure 3:
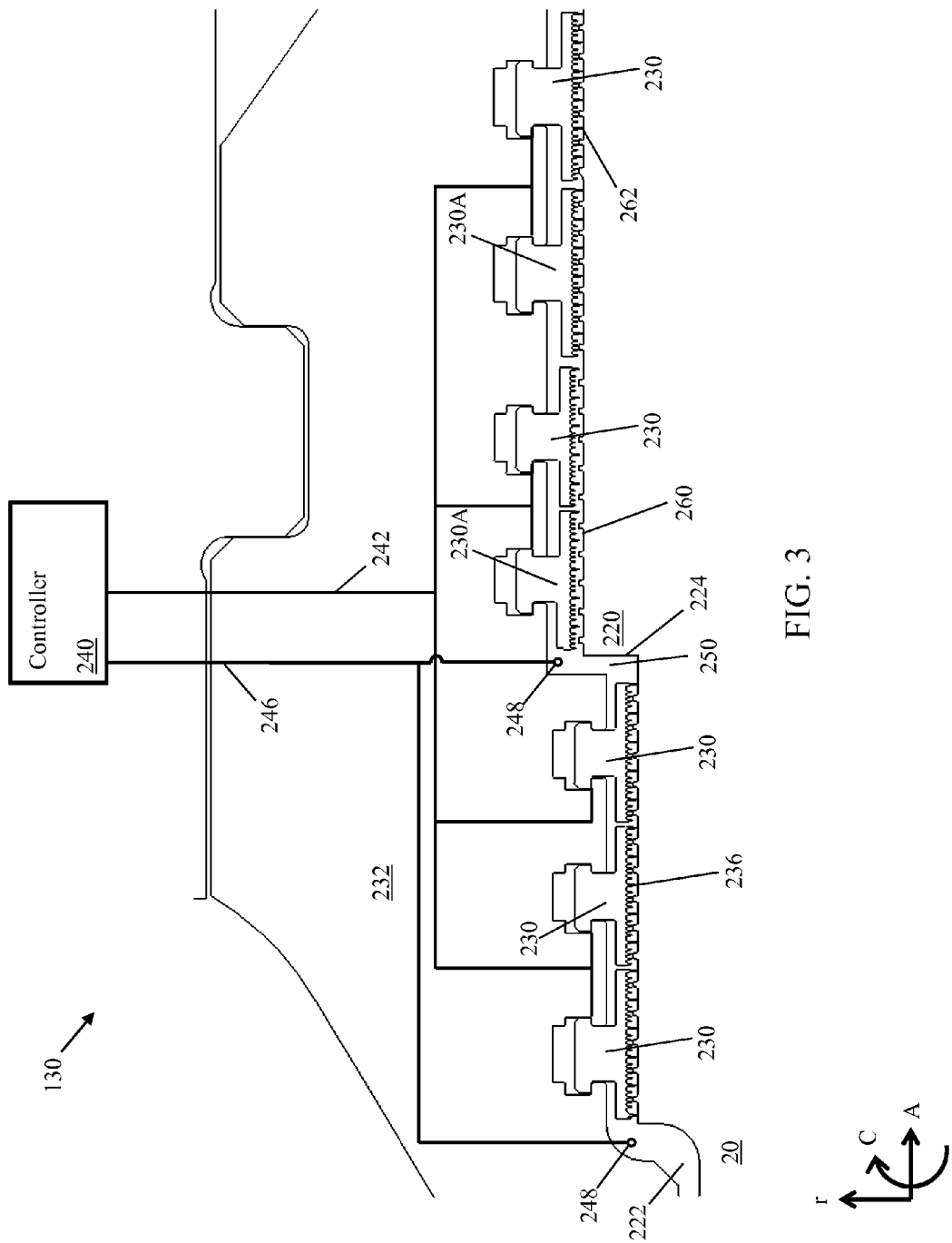
FIG. 3 is a cross-sectional diagram of a rotating component section and thrust fitting coupled to a controller according to an embodiment of the invention.

Turning to FIG. 3, an illustrative cross-sectional view of a section of junction 130 and rotor 20 along axes r and A is shown (see legend). Rotor 20 can include one or more thrust fittings 220, which in some embodiments can be a rotor step, thrust component, thrust body, or rotor body. The space above rotor 20 and around thrust fitting 220 can define a flow path 222 through which fluids such as steam or gas can travel. Thrust fitting 220 can include a first side 224 and/or, as shown in alternative embodiment in FIG. 5, a second side 226 against which fluids can impart a force, pressure, and/or thrust pressure on thrust fitting 220 in any direction.

As fluid flows through flow path 222, the corresponding pressure of the fluid can drop as it crosses thrust fitting 220 because of forces or pressures acting on first or second side 224, 226 (FIG. 5) of thrust fitting 220. The available space for fluid to flow within flow path 222 can further be defined by the space between packing seals 230, or packing seal casing 232, and rotor 20, thereby allowing a pressure drop to be present across thrust fitting 220. As shown in FIG. 3, flow path 222 can pass on top of thrust fitting 220, in which case the available space for fluid to flow can be defined by the space between thrust fitting 220 and packing seals 230A located on top of the thrust fitting. Unless explicitly distinguished herein, packing seals 230A can be implemented and/or modified in the same manner as packing seals 230.

Each packing seal 230 can be allowed to move along at least one axis of motion between several positions. Packing seals 230 can also be provided with a plurality of teeth 236 of similar or varying lengths, in order to create a tortuous route through flow path 222 as fluids therein cross each packing seal 230. In this manner, resultant thrust pressures can act upon thrust fitting 220 based on the pressure drop and/or pressure differential caused by the presence of packing seals 230 in flow path 222.

Figure 4:
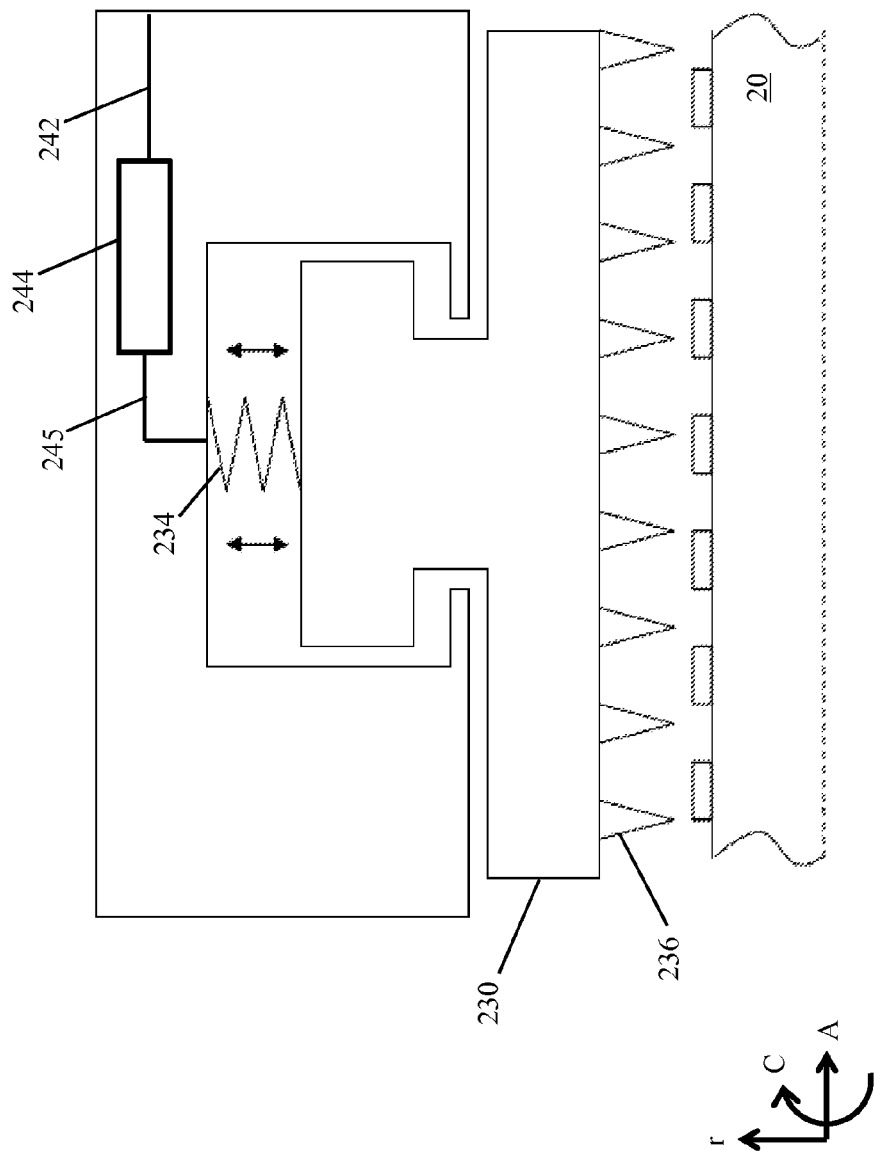
FIG. 4 is a cross-sectional diagram of a packing seal according to an embodiment of the invention.

Turning to FIG. 4, the movement capability of packing seal 230 is shown. By way of example, packing seal 230 includes a mechanical coupling component 234 depicted by example as a spring oriented in the radial direction. Mechanical coupling component 234 can be coupled to a controller 240 (FIGS. 3, 5, 6) through seal coupling 242, through which controller 240 (FIGS. 3, 5, 6) can provide instructions for moving packing seals 230 between several positions as will be described herein.

Seal coupling 242 can further be connected to converter 244. Converter 244 can be any currently known or later developed device capable of translating an electrical or mechanical signal to an expanding or contracting force in line 245, which can in some embodiments be coupled to mechanical coupling component 234. In this manner, controller 240 (FIG. 3) can cause converter 244 to move packing seal 230 in a direction by communicating a force along line 245. In an example according to FIG. 4, converter 244 can receive a signal from seal coupling 242 and can increase or reduce a tension in line 245 to expand or contract mechanical coupling component 234 to move packing seal 230. In addition to mechanical coupling components 234 and lines 245 shown in FIG. 4, other machinery can be used to move packing seal 230 to adjust the space between teeth 236 and rotor 20, including pressure lines, pistons, hydraulic equipment, temperature-sensitive equipment, pumps, and other devices.

Returning to FIG. 3, controller 240 for controlling thrust in a turbine can act, for example, at turbine junction 130. Junction 130 can represent any junction, as shown in FIG. 1, between high pressure and intermediate pressure sections 14, 16 of turbine system 10, intermediate pressure and low pressure sections 16, 18 of turbine system 10, or high pressure and low pressure sections 14, 18 of turbine system 10, or other junctions. Controller 240 can be coupled through sensor coupling 246 to one or more sensors 248. Sensor coupling 246 can be any currently known or later developed component capable of transmitting data, including a mechanical connection, an electrical connection, a wireless connection, and/or another appropriate connection mechanism.

Controller 240 can also be operatively connected through seal coupling 242 to one or more packing seals 230. Seal coupling 242 can be any currently known or later developed component capable of transmitting instructions and/or moving packing seals 230, including a mechanical connection, an electrical connection, a wireless connection, and/or another appropriate coupling mechanism. FIG. 3 depicts an example embodiment of the disclosure with seven packing seals 230 operatively connected to controller 240, but any number of packing seals 230 can be used, including one packing seal, five packing seals, seven packing seals, ten packing seals, etc. Controller 240 can be configured to select a clearance position that causes either a net positive thrust and a net negative thrust against thrust fitting 220 to avoid resultant thrust pressures that are close to zero and/or unstable. Further, the net positive thrust or the net negative thrust caused by fluid flow through the selected or desired clearance can be within a maximum loading condition for thrust fitting 220.

Flow path 222 can have a step section 250 substantially defined by thrust fitting 220. Fluids traversing flow path 222 can travel in a substantially radial direction through step section 250 relative to rotor 20 after contacting thrust fitting 220, thereby imparting a force or thrust pressure against thrust fitting 220. In other embodiments (e.g. FIG. 5), a second step section 252 can be on a different side of thrust fitting 220, and fluids traversing flow path 222 can travel in a substantially radial direction through second step section 252 toward or away from rotor 20.

Controller 240 can be operatively connected through one or more seal couplings 242 to several packing seals 230 and/or their respective mechanical coupling components 234 (FIG. 4). In this manner, controller 240 can be configured to move each packing seal 230 to several different clearance positions in response to a detected thrust pressure against thrust fitting 220. In effect, varying the position of packing seals 230 can provide the depicted clearances 260, 262 and/or other additional clearances between packing seals 230 and rotor 20 or thrust fitting 220.

In addition, controller 240 can be configured to interface with additional junction(s) 140, and/or any installations in which a thrust fitting 220 is provided on rotor 20. In this case, packing seals 230A can be on top of thrust fitting 220, such that selected clearances are between packing seal 230A (and/or corresponding teeth 236), and thrust fitting 220. Further, other packing seals 230 can be on top of rotor 20 and distal from thrust fitting 220 in a direction along axis A. In some embodiments, including the example illustrated in FIG. 3, thrust fitting 220 can project radially outward from rotor 20, with some packing seals 230 corresponding to rotor 20, and other packing seals 230A corresponding to thrust fitting 220.

Sensors 248 can be configured to detect variables other than thrust pressure against thrust fitting 220, if desired. For example, a group of sensors 248 can detect one or more pressure drops across one or more packing seals 230 and relay data for these pressure drop values to controller 240. Other variables upon which controller 240 can select desired clearance positions can include, for example, forces and pressures imparted against other sections or components of rotor 20, the position of other packing seals 230 and their corresponding clearances, and net thrust or pressure against groups of thrust fittings 220 and any subcomponents.

Figure 5:
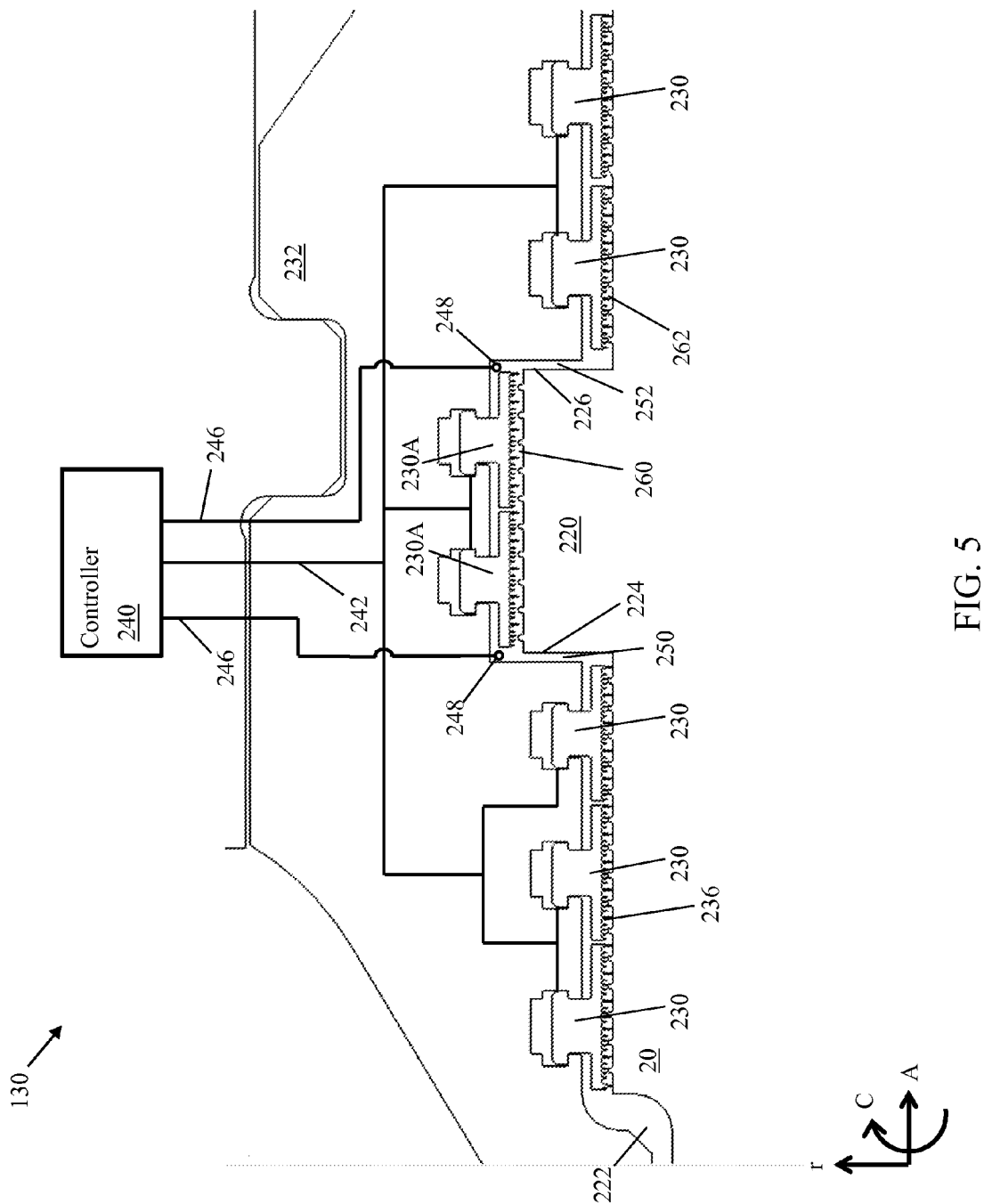
FIG. 5 is a cross-sectional diagram of an alternative rotating component section and thrust fitting coupled to a controller according to an embodiment of the invention.

FIG. 5 illustrates a further embodiment of junction 130 in which controller 240 can be configured to monitor and control variables such as thrust. FIG. 5 shows, by way of example, junction 130 including rotor 20 and thrust fitting 220. Thrust fitting 220 is now shown to have two step sections 250, 252 within flow path 222. Step sections 250, 252 can have different cross sectional areas, as depicted in FIG. 5. Thrust fitting 220 therefore can be subjected to forces and thrust pressures at multiple surfaces, including first and second sides 224, 226 of thrust fitting 220 defining step sections 250, 252, respectively. To aid controller 240 in controlling thrust pressure, sensors 248 can be coupled to controller 240 and provided in each of the step sections 250, 252 and relay variables such as thrust pressures and pressure drops against thrust fitting 220 to controller 240. In addition, controller 240 can instruct packing seals 230 and/or mechanical coupling components 234 (FIG. 4) in order to control thrust pressure as described elsewhere herein. Each modification discussed herein with respect to FIGS. 2-4 can be applied to the example junction 130 shown in FIG. 5, and other embodiments of the invention.

In some embodiments, as shown in FIG. 5, packing seal 230 can be housed within packing seal casing 232, and define a first fluid flow area corresponding the step section 250 on first side 224 of thrust fitting 220. Similarly, the space between packing seal casing 232 and second side 226 of thrust fitting 220 can define a second fluid flow area corresponding to second step section 252 on the other side of packing seal 230. If desired, the fluid flow area in each step section 252 can be different from each other, with one having a value greater than the other.

Figure 6:
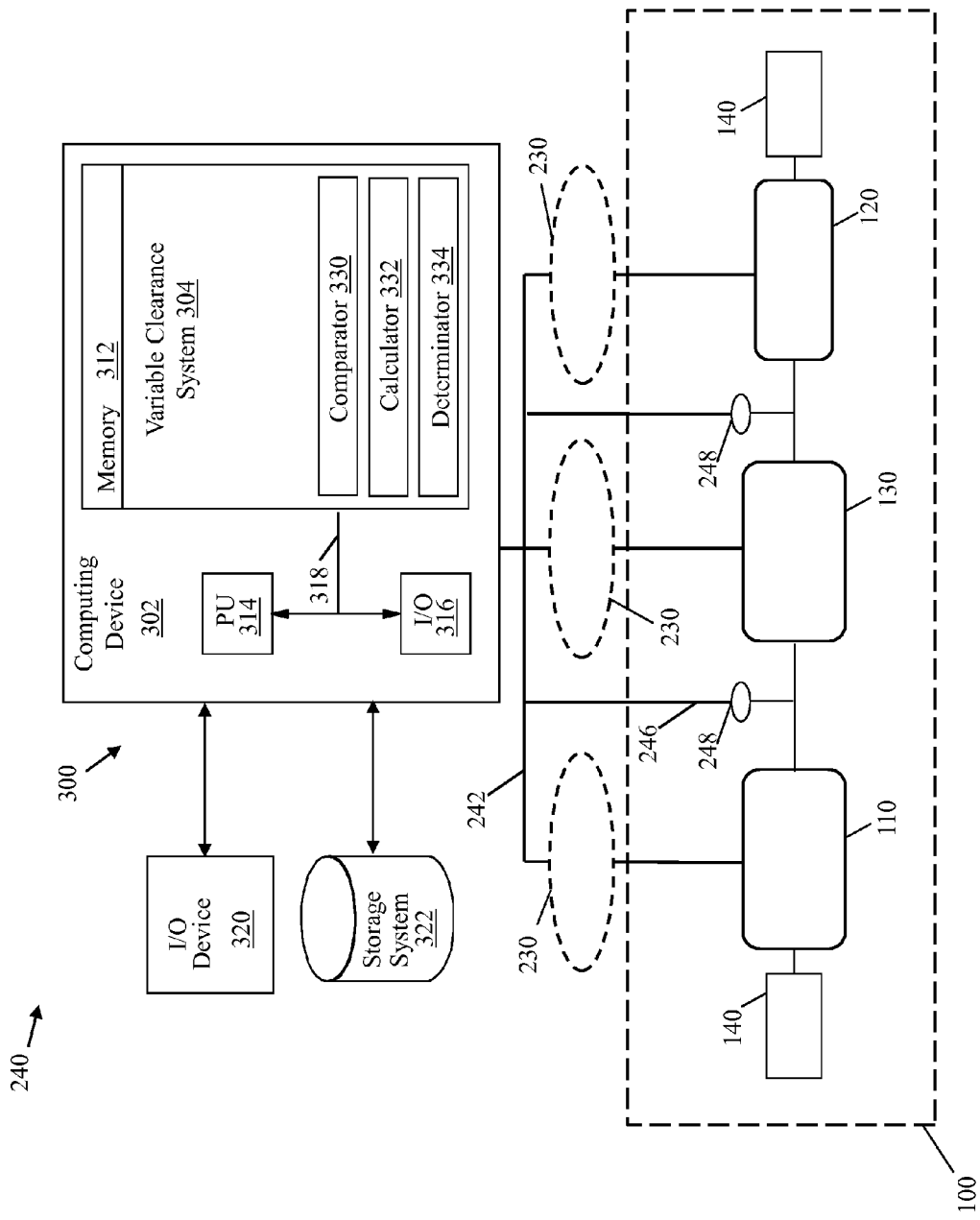
FIG. 6 is a schematic diagram of a controller coupled to a turbine section and packing seals according to an embodiment of the invention.

Turning to FIG. 6, an illustrative controller 240 is shown, including a computer infrastructure 300 that can perform the various processes described herein. In particular, computer infrastructure 300 is shown to include computing device 302, which includes variable clearance system 304. Variable clearance system 304 can enable computing device 302 to analyze and/or change variables (e.g., thrust pressure, pressure drops, etc.) acting on portions of turbine section 100 (e.g., rotor 20, thrust fitting 220 of FIGS. 3-5) according to embodiments of the disclosure.

The components shown in FIG. 6 are one embodiment of a system for controlling thrust in a turbine, including controller 240 configured to move a component, such as a packing seal 230, to a selected clearance position in response to a thrust pressure exceeding a target pressure. As discussed herein, controller 240 can provide instructions to components of a turbine and cause them to move, thereby moving packing seals 230 or other components within turbine section 100. Controller 240 may be operated manually by a technician, automatically by computing device 302, and/or in conjunction with a technician and computing device 302.

Variable clearance system 304 has the technical effect of enabling computing device 302 to perform, among other things, the thrust pressure control, adjustment and/or regulation described herein. It is understood that some of the various components shown in FIG. 6 can be implemented independently, combined, and/or stored in memory for one or more separate computing devices that are included in computing device 302. Further, it is understood that some of the components and/or functionality may not be implemented, or additional schemas and/or functionality may be included as part of variable clearance system 304.

Computing device 302 can include a memory 312, a processor unit (PU) 314, an input/output (I/O) interface 316, and a bus 318. Further, computing device 302 is shown in communication with an external I/O device/resource 320 and a storage system 322. Memory 312 can include various software components configured to perform different actions, including a comparator 330, a calculator 332, and/or a determinator 334. One or more of comparator 330, calculator 332, and/or determinator 334 can use algorithm-based calculations, look up tables, and similar tools stored in memory 312 for processing, analyzing, and operating on data to perform their respective functions. In general, PU 314 can execute computer program code to run software, such as variable clearance system 304, which can be stored in memory 312 and/or storage system 322. While executing computer program code, PU 314 can read and/or write data to or from memory 312, storage system 322, and/or I/O interface 316. Bus 318 can provide a communications link between each of the components in computing device 302. I/O device 320 can comprise any device that enables a user to interact with computing device 302 or any device that enables computing device 302 to communicate with the equipment described herein and/or other computing devices. I/O device 320 (including but not limited to keyboards, displays, pointing devices, etc.) can be coupled to the system either directly or through intervening I/O controllers (not shown).

In some embodiments, as shown in FIG. 6, controller 240 may be operably coupled through seal coupling 242 and converter 244 (FIG. 4) corresponding to one or more packing seals 230 to allow controller 240 to move packing seals 230. Packing seals 230 can include one or more mechanical coupling components 234 (FIG. 4) capable of being moved between positions, such as shafts, springs, or pistons. Controller 240 can also include sensors 248 located in turbine section 100 and communicatively connected to computing device 302 (e.g., via wireless or hard-wired means).

Sensors 248 can include position sensors, pressure sensors, and/or pressure taps. Sensors 248 can be configured to determine variables (e.g. pressures, forces, and changes in conditions) corresponding to portions of turbine section 100. Sensors 248 therefore can obtain data relating to thrust pressures, pressure drops, component displacements, etc. and provide them to computer infrastructure 300 via I/O interface 316. This data in memory 312 can be processed in variable clearance system 304 to regulate or manipulate the position of turbine components, such as packing seals 230.

In an embodiment, controller 240 can vary clearances (e.g., gaps between packing seals and rotating components, thrust fittings, etc.) within turbine section 100, including junction 130 between sections 110 and 120 or additional junctions 140, by providing instructions through seal coupling 242 to converter 244 (FIG. 4). The provided "instructions" can include electrical currents, signals, etc. capable of being converted to a mechanical action by converter 244 (FIG. 4). Alternatively, the instructions can be mechanical forces and pressures capable of causing packing seal 230 to move to clearance positions determined by controller 240. Further information on how instructions can be used to actuate packing seal 230 is provided elsewhere herein.

Computing device 302 can comprise any general purpose computing article of manufacture capable of executing computer program code installed by a user (e.g., a personal computer, server, handheld device, etc.). However, it is understood that computing device 302 is only representative of various possible equivalent computing devices and/or technicians that may perform the various process steps of the disclosure. In addition, computing device 302 can be part of a larger turbine control system.

To this extent, in other embodiments, computing device 302 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 302 may include a program product stored on a non-transitory computer readable storage device, which can be operative to control thrust in a turbine when executed.

Figure 7:
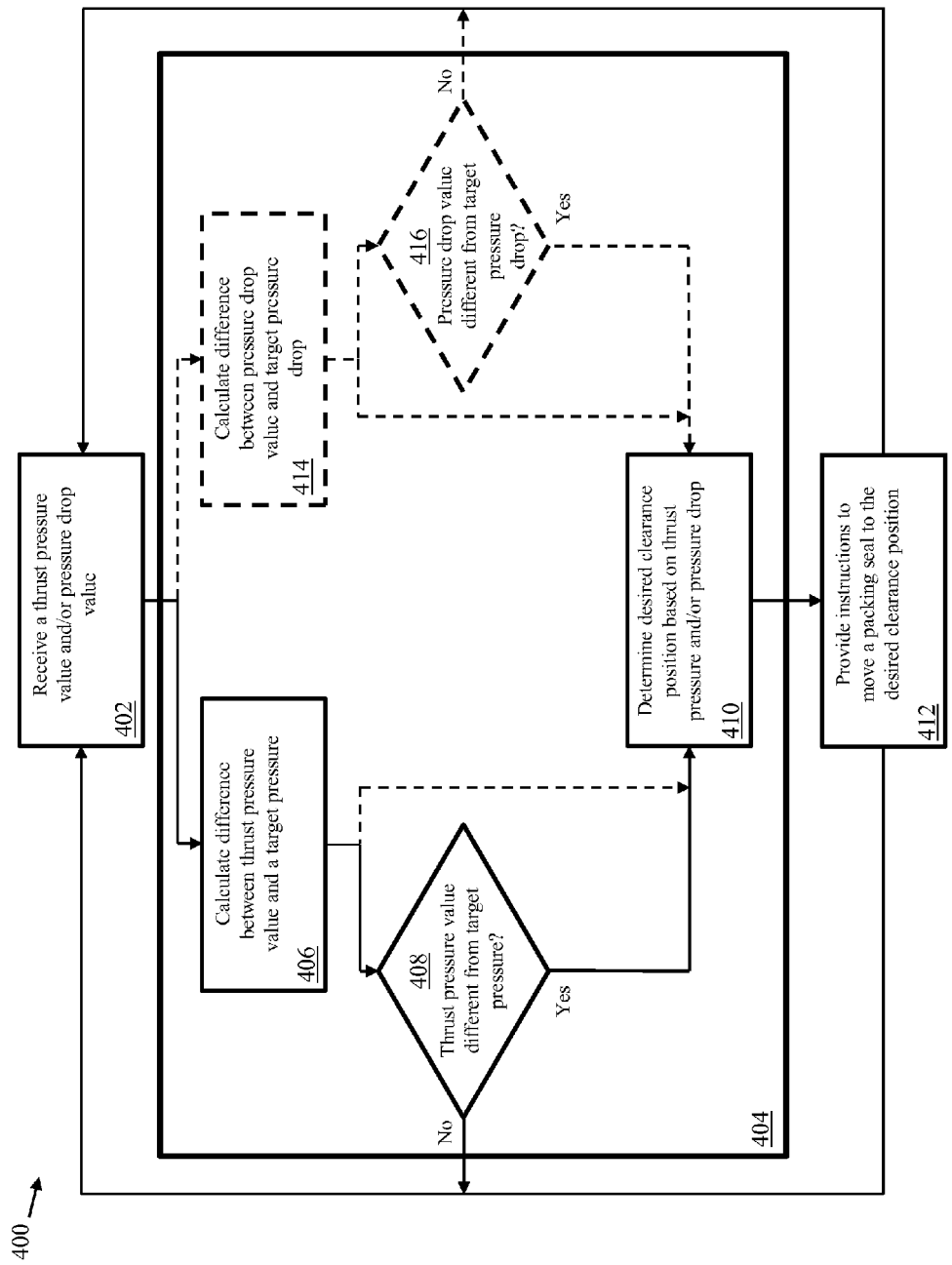
FIG. 7 is an example flow diagram according to an embodiment of the invention.

FIG. 7 shows an illustrative flow diagram according to an embodiment of the disclosure. FIG. 7 includes a process 400 for controlling thrust in turbine systems, including turbine system 10 (FIG. 2). Some or all of the steps of process 400 shown in FIG. 7 and described herein can be executed by controller 240 (FIG. 6) through variable clearance system 304 (FIG. 6) and components stored in memory 312 (FIG. 6), including comparator 330 (FIG. 6), calculator 332 (FIG. 6), and/or determinator 334 (FIG. 6). At least some of the operations discussed herein can be aided with tools such as algorithm-based calculations, look up tables, and similar approaches for processing, analyzing, and operating on data.

In step 402, controller 240 (FIG. 6) receives data for a thrust pressure value pertaining to one or more components of turbine section 100 (FIG. 6), including thrust pressure acting on rotor 20 (FIGS. 1-5) and/or thrust fitting 220 (FIGS. 3, 5). Controller 240 (FIG. 6) can receive the thrust pressure value through I/O device 320 (FIG. 6) of computing device 302 (FIG. 6). Thrust pressure values received in step 402 can be detected by one or more of sensors 248 (FIGS. 3-6), which by way of example can be a position sensor, a pressure sensor, and/or a pressure tap.

Upon receiving a thrust pressure value in step 402, controller 240 (FIG. 6) can execute a step 404 of determining a desired clearance position of a packing seal as described herein. Comparator 330 (FIG. 6) and calculator 332 (FIG. 6) can perform several, or in some embodiments, all of the processes described herein related to determining a desired clearance position based on a thrust pressure value or other variable in relation to a target pressure or variable. As an example, comparator 330 (FIG. 6) can compare the received thrust pressure value to a target pressure, and can either repeat process 400 when the values are equal or determine a desired clearance position based on the thrust pressure being unequal to the target pressure.

An example of steps performed within step 404 of determining a desired clearance position, according to the embodiment of FIG. 7, is described. Calculator 332 (FIG. 6) can perform step 406 of calculating a difference between the thrust pressure and the target pressure. In some embodiments, calculator 332 (FIG. 6) can perform step 406 in order to determine a size of the difference between the thrust pressure and the target pressure, which can influence the movement of packing seal 230 (FIG. 6) as described herein.

In one embodiment, comparator 330 (FIG. 6) of controller 240 (FIG. 6) can further perform step 408 to influence further steps of process 400 based on whether the thrust pressure value is equal to the target pressure (i.e., a difference between the thrust pressure value and target pressure is not zero). In situations where the received thrust pressure is the same as the target pressure, process 400 returns to step 402. In other situations where the received thrust pressure is different from the target pressure, process 400 moves to further steps. According to some embodiments of the invention, comparator 330 (FIG. 6) or calculator 334 (FIG. 6) can perform step 408 several times by comparing one thrust pressure value to several target pressures, or several thrust pressure values to several respective target pressures.

According to some embodiments, controller 240 (FIG. 6) can control packing seals 230 (FIG. 6) based on the size of the difference between the thrust pressure value and target pressure. Here, process 400 can omit step 408 (by following an alternative path shown in phantom) in cases where calculator 332 (FIG. 6) calculates a non-zero difference between the thrust pressure value and a target pressure.

Determinator 334 (FIG. 6) can execute step 408 of determining a desired clearance position. In embodiments of process 400 implementing step 408, determinator 334 (FIG. 6) can determine a desired clearance position for packing seal 230 based on of the thrust pressure value not being equal to the target pressure. Determinator 334 can determine a desired clearance position by reference to a look up table, using a mathematical algorithm, or using other methods currently known or later developed for finding a clearance position that corresponds to a thrust pressure. Controller 240 (FIG. 6) can then provide instructions for packing seal 230 to move to a pre-defined clearance position.

In other embodiments, determinator 334 can determine in step 410 a desired clearance position for packing seal 230 (FIG. 6) based on the size of the difference between the thrust pressure value and the target pressure, with step 408 of comparing the pressure value to the target pressure optionally being omitted. Determinator 334 can determine a desired clearance position by reference to a look up table, using a mathematical algorithm, or using other methods currently known or later developed for finding a clearance position that corresponds to a thrust pressure.

Controller 240 (FIG. 6) can perform step 412 of using the desired clearance position determined in step 410 to provide instructions to move a packing seal to the desired clearance position (e.g., via I/O device 320). Controller 240 (FIG. 6) can provide instructions to move packing seal 230 (FIG. 6) according to several approaches. For example, controller 240 (FIG. 6) can be operatively coupled (e.g., mechanically coupled or electronically coupled) to one or more packing seals 230 (FIG. 6). The coupling between controller 240 (FIG. 6) and packing seal 230 (FIG. 6) can apply a force to or move a connecting component upon a signal from controller 240, thereby causing packing seal 230 (FIG. 6) to change its position and its corresponding clearance with rotor 20 (FIG. 1) and/or its components. In other embodiments, a mechanical coupling component 234 (FIG. 4) for changing the position of the packing seal 230 (FIG. 6) can be distinct from the coupling to controller 240 (FIG. 6), but capable of receiving electronic or wireless instructions from controller 240 (FIG. 6) to move with packing seal 230 (FIG. 6) to the desired clearance position.

In other embodiments, process 400 can perform operations with different variables, including the pressure drop across one or more packing seals 230 (FIGS. 3-6). In step 402, controller 240 (FIG. 6) can also receive data for a pressure drop across one or more components of turbine section 100 (FIG. 6), including packing seals 230 (FIG. 6) and/or thrust fitting 220 (FIGS. 3, 5). In some embodiments, the pressure drop value can correspond to pressures on two sides of packing seal 230 (FIGS. 3-5). I/O device 320 (FIG. 6) of computing device 302 (FIG. 6) can receive data in step 402 from other components or from being coupled to two or more sensors 248 (FIG. 6). Sensors 248 (FIG. 6) can be position sensors, pressure sensors, pressure taps, or other mechanisms for detecting pressure currently known or later developed.

Where process 400 includes operations based on pressure drops, controller 240 (FIG. 6) can incorporate further or alternative steps into step 404 of determining a desired clearance position. As one example shown in FIG. 7, calculator 332 (FIG. 6) of controller 240 (FIG. 6) can perform step 414 (shown in phantom) of calculating a difference between the received pressure drop value and the target pressure drop, which can be used to change the degree to which controller 240 (FIG. 6) instructs packing seal 230 (FIG. 6) to move, as described herein. In further embodiments, comparator 330 (FIG. 6) or calculator 332 (FIG. 6) can calculate whether the pressure drop value and the target pressure drop are equal to each other.

Comparator 330 (FIG. 6) of variable clearance system 304 (FIG. 6) can optionally perform step 416 (shown in phantom) to influence further steps of process 400 based on whether the pressure drop value is equal to the target pressure drop. In situations where the received pressure drop value is the same as the target pressure drop (i.e., no difference), process 400 returns to step 402 of receiving a thrust pressure value. In other situations where the received thrust pressure is different from the target pressure drop (i.e., a difference exists), controller 230 (FIG. 6) executes further steps of process 400. According to some embodiments of the invention, comparator 330 (FIG. 6) can perform step 416 several times by finding differences between one pressure drop value and several target pressure drops, or several pressure drop values and several respective target pressure drops.

According to some embodiments, controller 240 (FIG. 6) can control packing seals 230 (FIG. 6) based on the size of the difference between the pressure drop value and the target pressure drop. Here, process 400 can omit step 416. Determinator 334 (FIG. 6) can execute step 410 of determining a desired clearance position in cases where the received pressure drop is different from the target pressure drop. Determinator 334 can determine a desired clearance position by reference to a look up table, using a mathematical algorithm, or using other methods currently known or later developed for finding a clearance position that corresponds to a pressure drop value. In some embodiments of process 400, determinator 334 (FIG. 6) can determine a desired clearance position for packing seal 230 (FIG. 6) based on the pressure drop value not being equal to the target pressure drop. In other embodiments, determinator 334 (FIG. 6) can determine a desired clearance position for packing seal 230 (FIG. 6) based on the size of the difference between the pressure drop value and the target pressure drop. Optionally, in further embodiments, determinator 334 (FIG. 6) can select a desired clearance position in response to the thrust pressure value differing from the target pressure, and/or the pressure drop value differing from the target pressure drop.

Controller 240 (FIG. 6) and its respective components are not limited to performing process 400 strictly according to the embodiments described herein, but can be customized as desired to accommodate machinery with complex designs and several points of interest. For example, controller 240 (FIG. 6) and determinator 334 (FIG. 6) can determine a plurality of respective desired clearance positions for each pressure drop value exceeding the target. In some embodiments discussed elsewhere herein, process 400 can be applied to situations in which packing seal 230 (FIGS. 3-6) defines two sides of thrust fitting 220 (FIGS. 3-5), with one side having a greater fluid flow area than the other side. Controller 240, in providing instructions to move a packing seal 230 (FIGS. 3-6) to the desired clearance position through I/O device 320 (FIG. 6), can also provide instructions to a plurality of packing seals 230 (FIGS. 3-6).

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from active control apparatuses, programs, and systems described herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for controlling thrust in a turbine, the system comprising:
   a packing seal housed within a packing seal casing and positioned radially distal to a thrust fitting mounted circumferentially on a rotor of the turbine;
   a controller communicatively coupled to the packing seal such that the controller is configured to move the packing seal to a selected clearance position in response to a thrust pressure against the rotor exceeding a target pressure; and
   a sensor coupled to the controller and configured to detect the thrust pressure against the rotor.

2. The system for controlling thrust in a turbine of claim 1, wherein the packing seal further includes a mechanical coupling component operatively connected to the controller.

3. The system for controlling thrust in a turbine of claim 1, wherein the thrust fitting defines a step section within the turbine.

4. The system for controlling thrust in a turbine of claim 1, wherein the thrust pressure comprises a first thrust pressure and a second thrust pressure, and the target pressure comprises a first target pressure and a second target pressure, wherein the controller is configured to move the packing seal to the selected clearance position in response to one of the first thrust pressure exceeding the first target pressure and the second thrust pressure exceeding the second target pressure.

5. The system for controlling thrust in a turbine of claim 1, wherein the selected clearance position causes one of a net positive thrust and a net negative thrust against the thrust fitting, and the net positive thrust and the net negative thrust are within a maximum loading condition.

6. The system for controlling thrust in a turbine of claim 1, wherein the packing seal is located at one of a low pressure-intermediate pressure junction, an intermediate pressure-high pressure junction, and a low pressure-high pressure junction.

7. The system for controlling thrust in a turbine of claim 1, wherein the controller is further configured to move the packing seal to the selected clearance position in response to a pressure drop across the packing seal exceeding a target pressure drop.

8. The system for controlling thrust in a turbine of claim 1, wherein the packing seal casing defines a first fluid flow area on a first side of the packing seal, and a second fluid flow area on a second side of the packing seal, the first fluid flow area being greater than the second fluid flow area.

9. The system for controlling thrust in a turbine of claim 1, wherein the packing seal comprises one of a plurality of packing seals within the packing seal casing.

10. The system for controlling thrust in a turbine of claim 9, wherein the selected clearance position comprises a plurality of selected clearance positions corresponding to each of the plurality of packing seals, and the system is further configured to move each of the plurality of packing seals to the corresponding one of the plurality of selected clearance positions.

11. A system for controlling thrust in a turbine, the system comprising:
    a packing seal housed within a packing seal casing and positioned radially distal to a thrust fitting mounted circumferentially on a rotor of the turbine; and a controller communicatively connected to the packing seal, wherein the controller moves the packing seal to a selected clearance position in response to one of the following:
- a thrust pressure against the thrust fitting exceeding a target pressure; and
- a pressure drop across the packing seal exceeding a target pressure drop;

wherein the selected clearance position causes one of a net positive thrust and a net negative thrust against the thrust fitting.

12. A program product stored on a non-transitory computer readable storage device, the program operative to control thrust in a turbine when executed, the non-transitory computer readable storage device being communicatively coupled to a packing seal housed within a packing seal casing and positioned radially distal to a thrust fitting mounted circumferentially on a rotor of the turbine, wherein the non-transitory computer readable storage device comprises program code for:
- receiving a signal indicative of a thrust pressure against the thrust fitting;
- calculating a difference between the thrust pressure and a target pressure;
- determining a desired clearance position of the packing seal relative to the rotor based on a size of the difference between the thrust pressure and the target pressure; and
- actuating the packing seal to move to the desired clearance position.

13. The program product of claim 12, wherein the packing seal comprises one of a plurality of packing seals positioned radially distal to the thrust fitting.

14. The program product of claim 12, further comprising program code for:
- receiving a pressure drop value pertaining to a pressure drop across the packing seal; and
- determining the desired clearance position based on both the difference between the thrust pressure and the target pressure, and the difference between the pressure drop value and the target pressure drop.

15. The program product of claim 14, further comprising program code for calculating one of a difference between the thrust pressure and the target pressure, and a difference between the pressure drop value and the target pressure drop, wherein the determining includes determining the desired clearance position based on a size of the difference between the thrust pressure and the target pressure, and the difference between the pressure drop value and the target pressure drop.

* * * * *